US010686838B2

(12) United States Patent
Park et al.

(10) Patent No.: US 10,686,838 B2
(45) Date of Patent: Jun. 16, 2020

(54) IPS SWITCH SYSTEM AND PROCESSING METHOD

(71) Applicant: WINS Co., Ltd., Gyeonggi-do (KR)

(72) Inventors: Cheol Jeong Park, Gyeonggi-do (KR); Young Kook Noh, Seoul (KR)

(73) Assignee: WINS CO., LTD., Gyeonggi-Do (KR)

( * ) Notice: Subject to any disclaimer, the term of this patent is extended or adjusted under 35 U.S.C. 154(b) by 586 days.

(21) Appl. No.: 15/417,528

(22) Filed: Jan. 27, 2017

(65) Prior Publication Data

US 2017/0257398 A1    Sep. 7, 2017

(30) Foreign Application Priority Data

Mar. 7, 2016    (KR) .......................... 10-2016-0027239

(51) Int. Cl.
*G06F 21/00* (2013.01)
*H04L 29/06* (2006.01)

(52) U.S. Cl.
CPC .......... *H04L 63/20* (2013.01); *H04L 63/0236* (2013.01); *H04L 63/0263* (2013.01); *H04L 63/101* (2013.01); *H04L 63/1425* (2013.01); *H04L 63/1433* (2013.01); *H04L 63/1441* (2013.01)

(58) Field of Classification Search
None
See application file for complete search history.

(56) References Cited

U.S. PATENT DOCUMENTS

| 7,614,083 | B2* | 11/2009 | Khuti | H04L 63/02 726/22 |
| 8,010,469 | B2* | 8/2011 | Kapoor | G06F 9/505 706/20 |
| 9,231,889 | B2* | 1/2016 | Gallatin | H04L 12/4645 |
| 9,276,877 | B1* | 3/2016 | Chua | H04L 45/02 |
| 2007/0064725 | A1* | 3/2007 | Minami | H04L 29/06 370/463 |

(Continued)

FOREIGN PATENT DOCUMENTS

| JP | 2010-532633 A | 10/2010 |
| KR | 2002-0041004 A | 5/2002 |

(Continued)

OTHER PUBLICATIONS

Office action dated Aug. 28, 2017 from Korean Patent Office in a counterpart Korean Patent Application No. 10-2016-0027239 (English translation is submitted herewith.).

*Primary Examiner* — Maung T Lwin
(74) *Attorney, Agent, or Firm* — The PL Law Group, PLLC

(57) ABSTRACT

An intrusion protection system (IPS) switch system forwards traffic inserted from a switch to a destination port, simultaneously copying and storing the traffic output to an internal port by a port mirroring method of the switch, detecting maleficence inspection of the stored packet based on a protocol/pattern, providing a blocking control policy (e.g., Access Control List (ACL)) to an output port of the switch based on IP or MAC information of the terminal detected of maleficence to prevent expansion of maleficent packets, and transmitting traffic whose destination is outside to the IPS processor to transmit only normal packets to the outside after detecting/blocking maleficence based on the protocol/pattern, and a processing method thereof.

11 Claims, 5 Drawing Sheets

(56) References Cited

U.S. PATENT DOCUMENTS

| | | | | |
|---|---|---|---|---|
| 2009/0003317 A1* | 1/2009 | Kasralikar | ........... | H04L 63/1408 370/352 |
| 2011/0113230 A1* | 5/2011 | Kaminsky | ............. | G06F 21/575 713/2 |
| 2011/0292936 A1* | 12/2011 | Wang | ...................... | H04L 45/24 370/389 |
| 2012/0311664 A1* | 12/2012 | Elrod | ................... | H04L 63/0227 726/1 |
| 2013/0275574 A1* | 10/2013 | Hugard, IV | ............ | H04L 41/12 709/224 |
| 2014/0280829 A1* | 9/2014 | Kjendal | ................ | H04L 43/028 709/223 |
| 2016/0226967 A1* | 8/2016 | Zhang | ..................... | H04L 49/25 |
| 2017/0063731 A1* | 3/2017 | Muller | .................... | H04L 43/10 |

FOREIGN PATENT DOCUMENTS

| | | |
|---|---|---|
| KR | 10-2004-0051435 A | 6/2004 |
| KR | 2006-0017109 A | 2/2006 |

* cited by examiner

IPS SWITCH SYSTEM AND PROCESSING METHOD

CROSS REFERENCE TO RELATED APPLICATION

This application claims priority to and the benefit of Korean Patent Application Nos. 10-2016-0027239 filed on Mar. 7, 2016 in the Korean Intellectual Property Office, the entire contents of which are incorporated herein by reference.

BACKGROUND

1. Technical Field

The present invention relates to an intrusion protection system (IPS) switch system and a processing method thereof. More specifically, it relates to an IPS switch system forwarding traffic inserted from a switch to a destination port, simultaneously copying and storing the traffic output to an internal port by a port mirroring method of the switch, detecting maleficence inspection of stored packets based on a protocol/pattern, providing a blocking control policy (e.g., Access Control List (ACL)) to an output port of the switch based on internet protocol (IP) or media access control (MAC) information of a terminal detected of maleficence to prevent expansion of maleficent packets, and transmitting traffic whose destination is outside to an IPS processor to transmit only normal packets to the outside after conducting detection/blocking of the maleficence based on the protocol/pattern, and a processing method thereof

2. Background Art

The conventional security equipment such as firewall/IPS/anti DDos/web application firewall, etc. is installed in the gateway section of a network and used as an equipment for detecting and blocking maleficent packets transmitted from an external network.

However, although mobile terminals (e.g., laptop computers, PDAs, smartphones) for business use increase and these mobile terminals access an internal network in a state contaminated from the outside or continuously expand after contaminating the terminal of the internal network through an advanced target attack, since such problems are caused by internal communication of the internal network, the maleficence of the security equipment installed in the gateway section cannot be determined.

A product such as security switch which mounts a security function on a switch equipment has been released to detect maleficence expanding between such internal terminals/equipment. However, since the security switch adopts a system detecting maleficence based on network statistics information, the accuracy of detecting maleficent packets is low, and various abnormal protocols and maleficent patterns included in a payload cannot be detected, like the case for security equipment.

Security equipment developers also attempted to develop security equipment incorporating a switching function into security engines and apply it to the internal network. However, there were problems that too many system resources were required to perform security inspection on all traffic transmitted between internal terminals and it had a structure forwarding packets after security inspection is complete, and thus the entire service was delayed.

SUMMARY

In order to solve the problems in incorporating switching functions into security equipment, as stated above, the present invention provides an IPS switch system, which has no service delay by immediately forwarding traffic inserted from a switch to a destination port, simultaneously copying a packet output to an internal port by a mirroring method to perform security inspection based on a protocol/pattern, ensures security of the system, which can maintain the same processing load regardless of the amount of traffic transmitted by security inspection of packets transmitted between internal networks applying a dynamic sampling technique based on time applying a ring buffer switching method and inspection of maleficent packets inspecting only a defined amount of packets, and performs total inspection with regard to suspicious IPS in order to overcome the disadvantages of sampling, and a processing method thereof.

The system of the present invention includes a switching processor for switching an inserted packet to output it to a destination port, mirroring the traffic output to an internal port to transmit it to the following packet storing processor, and transmitting the traffic output to an external port to the following IPS processor; a packet storing processor for storing packets registered as suspicious IP in the traffic mirrored in the switching processor and other packets separately; and an IPS processor for blocking a packet whose maleficence has been confirmed by performing security inspection based on a protocol/pattern with respect to the packets stored in the packet storing processor and providing a blocking control policy to an output port based on the IP/MAC to the switching processor to block an internal terminal determined to be maleficent.

The switching processor of the system of the present invention includes a packet switching module for switching the packet inserted from the inside to an inner connection port and an outer connection port; a packet mirroring module for copying an output packet where a destination output port is the inside and transmitting it to the packet storing processor; and a switch controlling module for providing/managing blocking information to block a mapped packet by matching with the blocking information among the packets output to the inside/outside.

The packet storing processor of the system of the present invention includes a storage space selecting module for selecting and storing a storage space according to the condition of the inside output packet transferred from the switching processor; a suspicious IP database for storing IP registered as suspicious IP; a suspicious packet reservoir for storing packets having the same IP as the IP registered as suspicious IP in the suspicious IP database; and an analysis packet storing module for storing packets other than the packets having the same IP as the IP registered as suspicious IP, wherein the storage space selecting module stores the packets having the same IP as the IP registered as suspicious IP in the suspicious packet reservoir and other packets in the analysis packet storing module.

The analysis packet storing module of the system of the present invention includes a first analysis packet reservoir for storing the analysis packet in the storing step; and a second analysis packet reservoir for storing the analysis packet in the analyzing step.

The analysis packet storing module initializes the second analysis packet reservoir when maleficence inspection at the IPS processor of the packet recorded in the second analysis packet reservoir is complete, and operates in a storage space switching method which switches the second analysis packet reservoir and the first analysis packet reservoir, and the first analysis packet reservoir has a ring buffer structure where the record point moves in a ring method.

Meanwhile, the method of the present invention includes (A) a switching processor determining whether the destination is the inside or outside when a packet is input from the inside; (B) as a result of determination, the switching processor outputting to an internal port when the destination is the inside, and mirroring the output packet and transmitting it to a packet storing processor; (C) an IPS processor performing total internal threat detection/blocking when the packet transmitted to the packet storing processor matches the suspicious IP; and (D) the IPS processor performing maleficence inspection by sample internal threat detection when the packet transmitted to the packet storing processor does not match the suspicious IP.

The method of the present invention further includes (E) the switching processor transmitting to the IPS processor when the destination is the outside as a result of the determination in the step (A); (F) the IPS processor performing total external threat detection and blocking; and (G) the IPS processor transmitting packets not maleficent to the outside.

The method of the present invention further includes (H) the packet storing processor storing packets having the same IP as the IP registered as suspicious IP in a suspicious packet reservoir; and (I) the packet storing processor storing packets other than the packets having suspicious IP in an analysis packet storing module.

The step (I) in the method of the present invention includes (I1) the packet storing processor storing packets other than the packets having suspicious IP after a record point location in a first analysis packet reservoir; (I2) the packet storing processor initializing a second analysis packet reservoir when changing a record location; and (I3) the packet storing processor switching the storage location from the second analysis packet reservoir to the first analysis packet reservoir.

The IPS switch system and processing method of the present invention have effects such that it can inspect maleficence based on a protocol/pattern without delay with regard to not only traffic of an external network, but also bulk traffic exchanged between terminals/systems of an internal network, ensure security of the system, which can maintain the same processing load regardless of the amount of traffic transmitted by inspecting maleficence of packets in a dynamic sampling technique based on time applying a ring buffer switching method (the existing sampling technique had problems that the sampling needs to be changed manually according to the amount of traffic), and track close security inspection through total inspection with regard to suspicious terminals.

DETAILED DESCRIPTION

Figure 1:
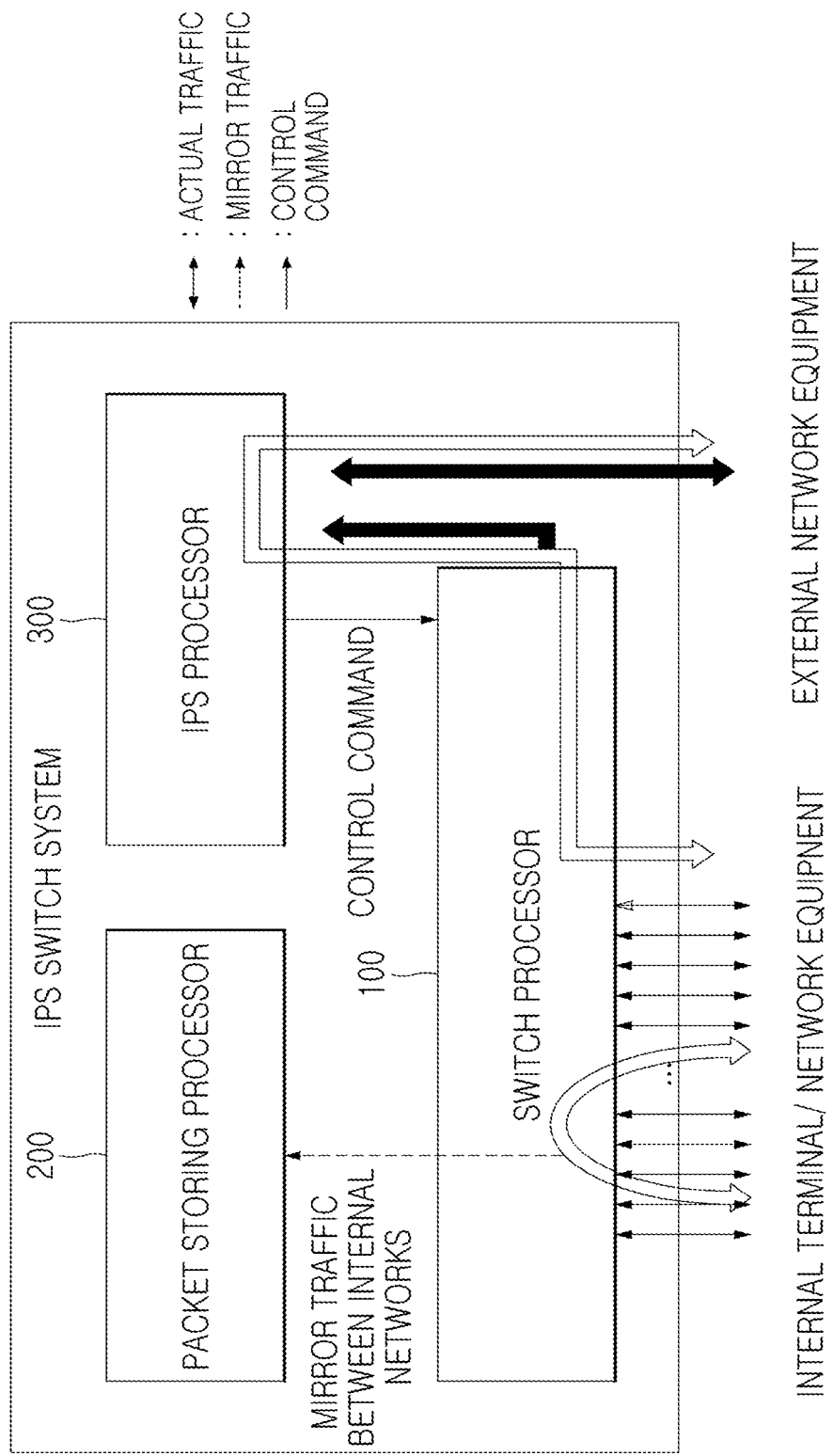
FIG. 1 is a block diagram schematically illustrating the IPS switch system according to an embodiment of the present invention.

While the present invention is susceptible to various modifications and alternative forms, specific embodiments thereof are shown by way of example in the drawings and will herein be described in detail.

When it is determined that the detailed description of the known art related to the present invention may obscure the gist of the present invention, the detailed description thereof will be omitted.

Although the terms "first," "second," etc. may be used herein to describe various elements, the elements should not be limited by these terms. These terms are only used to distinguish one element from another element.

Hereinafter, embodiments of the present invention will be described in detail with reference to the accompanying drawings.

FIG. 1 is a block diagram schematically illustrating the IPS switch system according to an embodiment of the present invention.

Referring to FIG. 1, the IPS switch system according to an embodiment of the present invention includes a switching processor 100, a packet storing processor 200 and an IPS processor 300.

In the above constitution, the switching processor 100 switches an inserted packet to output it to a destination port, simultaneously mirrors (copies) the traffic output to an internal port to transmit it to the packet storing processor 200, and all of the traffic output to an external port are transmitted to the IPS processor 300.

Then, the packet storing processor 200 stores packets registered as suspicious IP in the traffic mirrored in the switching processor 100 and other packets separately.

Next, the IPS processor 300 blocks a packet whose maleficence has been confirmed by performing security inspection based on a protocol/pattern with respect to the packets stored in the packet storing processor 200 and provides a blocking control policy (e.g., ACL) to an output port based on the IP/MAC to the switching processor 100 to block the internal terminal determined to be maleficent.

Figure 2:
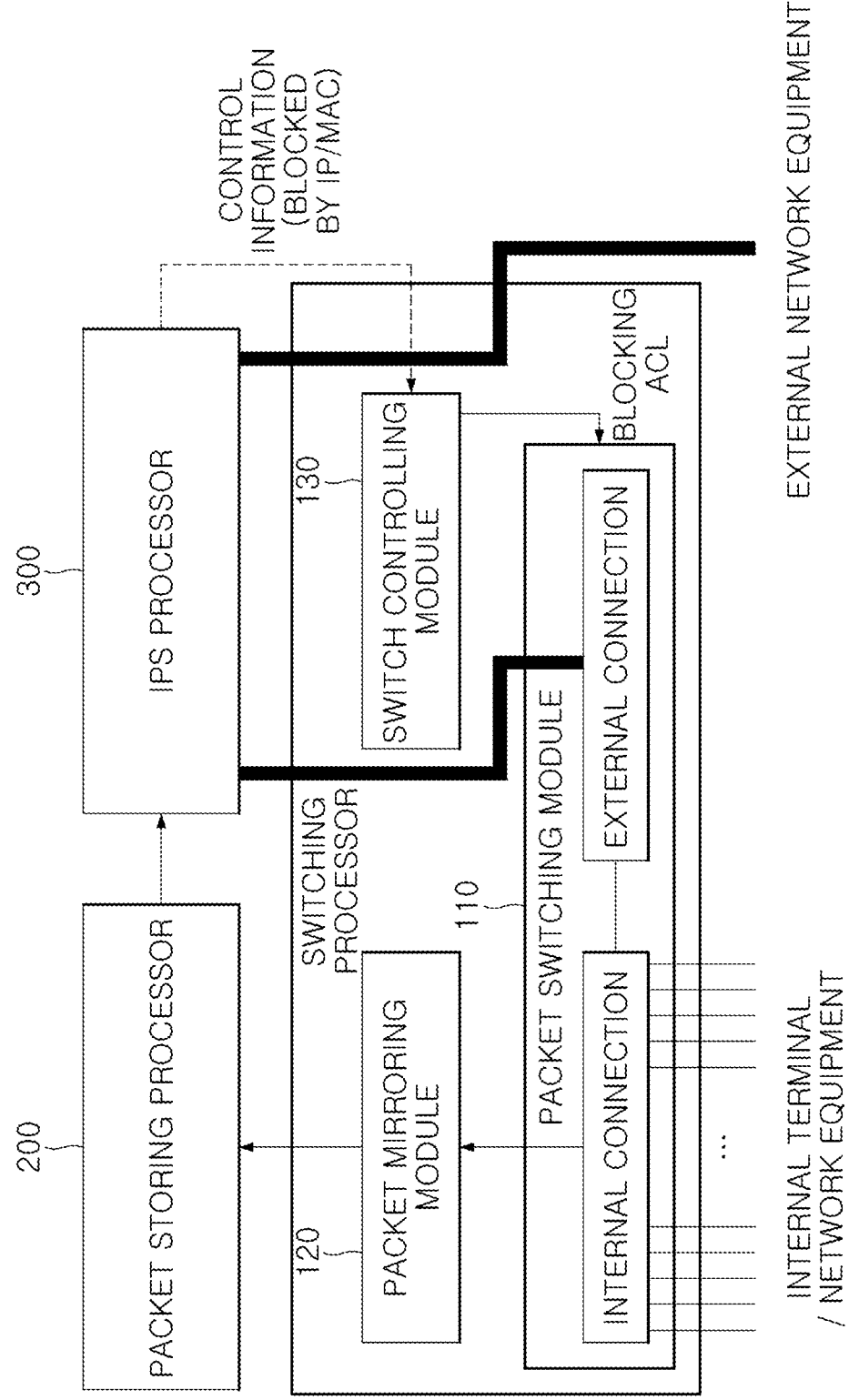
FIG. 2 is a block diagram schematically illustrating the constitution of the switching processor in FIG. 1.

FIG. 2 is a block diagram schematically illustrating the constitution of the switching processor 100 in FIG. 1.

Referring to FIG. 2, the switching processor 100 in FIG. 1 includes a packet switching module 110 for switching a packet inserted from the inside to an inner connection port and an outer connection port; a packet mirroring module 120 for copying an output packet where a destination output port is the inside at that time and transmitting it to the packet storing processor 200; and a switch controlling module 130 for providing/managing blocking information (IP or MAC information) to block a mapped packet by matching with the blocking information among the packets output to the inside/outside (e.g., ACL method).

Figure 3:
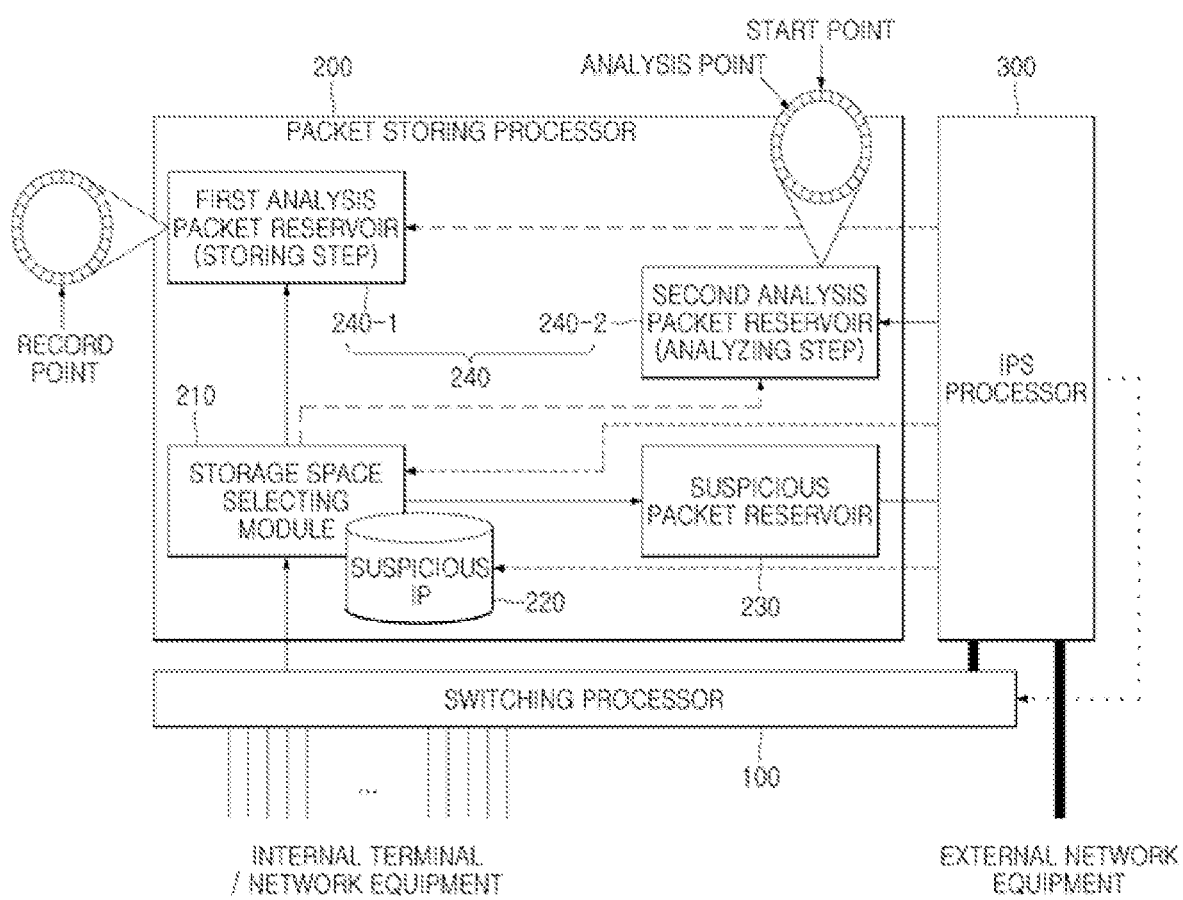
FIG. 3 is a block diagram schematically illustrating the constitution of the packet storing processor in FIG. 1.

FIG. 3 is a block diagram schematically illustrating the constitution of the packet storing processor 200 in FIG. 1.

Referring to FIG. 3, the packet storing processor 200 in FIG. 1 includes a storage space selecting module 210 for selecting and storing a storage space according to the condition of the inside output packet transferred from the switching processor 100; a suspicious IP database 220 for storing IP registered as suspicious IP (which is deleted after a predetermined time); a suspicious packet reservoir 230 for storing packets having the same IP as the IP registered as suspicious IP in the suspicious IP database 220; and an analysis packet storing module 240 for storing packets other than the packets having the same IP as the IP registered as suspicious IP.

The storage space selecting module 210 stores the packets having the same IP as the IP registered as suspicious IP (which is deleted after a predetermined time) in the suspicious packet reservoir 230 and other packets in the analysis packet storing module 240.

The analysis packet storing module 240 includes a first analysis packet reservoir 240-1 for storing the analysis packet in the storing step; and a second analysis packet reservoir 240-2 for storing the analysis packet in the analyzing step.

The analysis packet storing module 240 initializes the second analysis packet reservoir 240-2, which is a storage space of the analyzing step, when maleficence inspection in a threat detecting module 310 of the IPS processor 300 on the packet recorded in the second analysis packet reservoir 240-2, which is a storage space of the analyzing step, is complete, and operates in a storage space (ring buffer) switching method which switches the second analysis packet reservoir 240-2, which is an analysis packet storage space of the analyzing step, and the first analysis packet reservoir 240-1, which is an analysis packet storage space of the storing step. The first analysis packet reservoir 240-1, which is an analysis packet storage space of the storing step, has a ring buffer structure where the record point moves in a ring method so as to maintain the same amount of packets that can analyze the maleficence of packets even when a large amount of packets are transmitted, thereby maintaining the maleficence inspection time to be constant.

Figure 4:
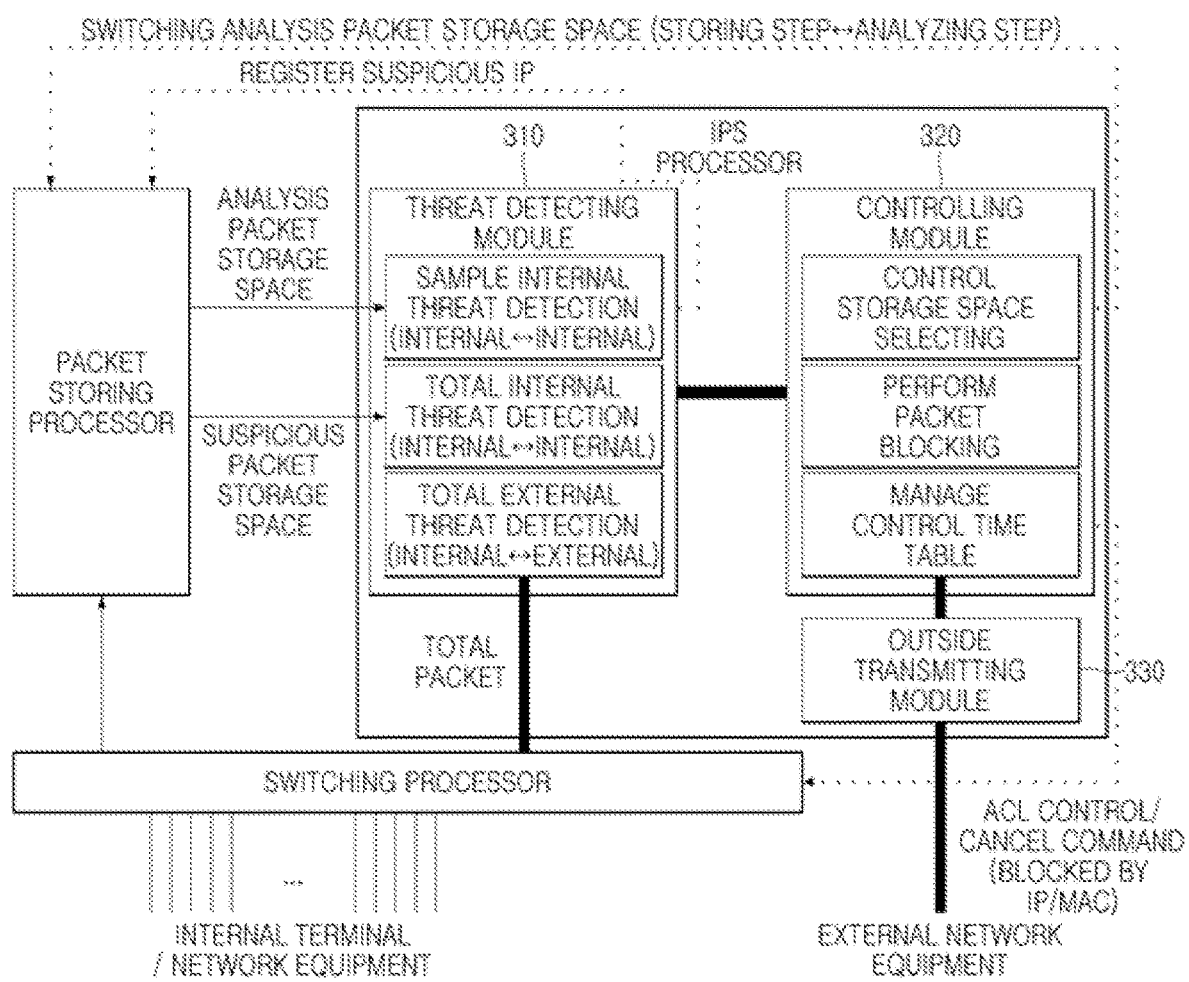
FIG. 4 is a block diagram schematically illustrating the constitution of the IPS processor in FIG. 1.

FIG. 4 is a block diagram schematically illustrating the constitution of the IPS processor 300 in FIG. 1.

Referring to FIG. 4, the IPS processor 300 in FIG. 1 includes a threat detecting module 310 for proceeding maleficence inspection based on a protocol/pattern with respect to three input packets, a controlling module 320 for controlling packets found to be maleficent, and an outside transmitting module 330 for transmitting/receiving traffic to/from the outside.

The threat detecting module 310 includes a sample internal threat detection for inspecting maleficence of packets exchanged between internals recorded in the analysis packet storing module 240 of the packet storing processor 200 and registering IP of the internal terminal detected to be maleficent as suspicious IP, a total internal threat detection for inspecting maleficence of packets exchanged between internals stored in the suspicious packet reservoir 230 of the packet storing processor 200, and a total external threat detection for total inspection of packets exchanged with the outside.

The controlling module 320 includes a storage space selecting control for initializing the second analysis packet reservoir 240-2, which is an analysis packet storage space of the analyzing step, when maleficence inspection of the second analysis packet reservoir 240-2, which is the analysis packet storage space of the analyzing step, of the packet storing processor 200, is completed (when the start point and analysis point become the same), and switching the second analysis packet reservoir 240-2, which is the analysis packet storage space of the analyzing step, and the first analysis packet reservoir 240-1, which is the analysis packet storage space of the storing step, a packet blocking performance for blocking the packets detected to be maleficent and recording the blocking history, and a control time table management for providing an output ACL control command to the internal terminal where packet blocking is generated for the first time, prolonging the control time according to the continuity of maleficence and providing an ACL cancel command when the control time terminates.

Also, the outside transmitting module 330 transmits packets completed with maleficence inspection among the defined packets to the outside through an external output port.

Figure 5:
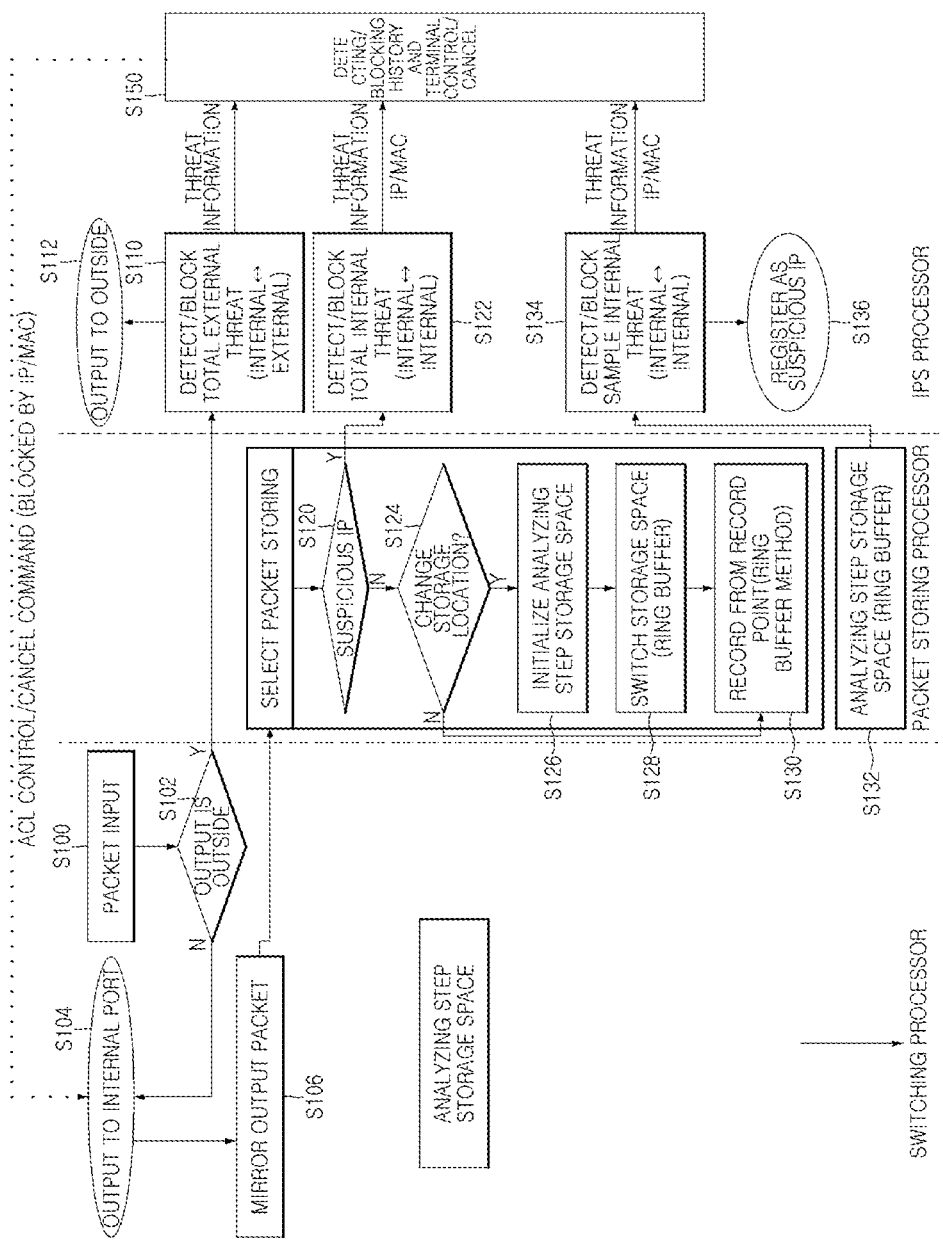
FIG. 5 is a flow chart for explaining the operation of the method for processing the IPS switch system according to an embodiment of the present invention.

FIG. 5 is a flow chart for explaining the operation of the method for processing the IPS switch system according to an embodiment of the present invention.

Referring to FIG. 5, according to the method for processing the IPS switch system according to an embodiment of the present invention, first, when a packet is input from the inside (S100), the switching processor 100 determines whether the output is to the outside (S102) in order to determine whether the destination of the input packet is the inside or outside.

As a result of determination, since the output is to the inside when the output is not to the outside, the switching processor 100 matches the packet with the output port ACL blocking policy and outputs packets not mapped to the internal port (S104), and simultaneously mirrors the output packet and transmits it to the packet storing processor 200 (S106).

Meanwhile, as a result of determination, when the output is to the outside, the switching processor 100 transfers the output packet to the IPS processor 300, and the IPS processor 300 performs total external threat detection/blocking for packets whose destination is the outside (S110) and transmits packets that are not maleficent to the outside (S112).

Next, the IPS processor 300 performs total internal threat detection/blocking when the packet transmitted to the packet storing processor 200 matches the suspicious IP (S120), and provides control information on the threat generating terminal (S150).

Also, the packet storing processor 200 stores packets having the same IP as the IP registered as suspicious IP at the suspicious packet reservoir 230, and stores packets other than those having suspicious IP at the analysis packet storing module 240.

The process of the packet reservoir 200 storing packets other than those having suspicious IP at the analysis packet storing module 240 is explained in detail in the following.

The packet storing processor 200 stores packets other than the packets having suspicious IP after a record point location in the first analysis packet reservoir 240-1, which is the analysis packet storage space of the storing step (S130), initializes the second analysis packet reservoir 240-2 when changing a record location (S124) and switches the storage location from the second analysis packet reservoir 240-2 to the first analysis packet reservoir 240-1 (S128), the packet stored in the second analysis packet reservoir 240-2, which is the storage space in the analyzing step, performs maleficence inspection through sample internal threat detection by the IPS processor 300 (S134), provides information to control the threat generating terminal (S150), and additionally registers the IP of the threat generating terminal as suspicious IP in the suspicious IP database (S136).

The IPS processor 300 operates by providing a blocking command based on ACL to the output port of the switch based on the threat generation terminal information transmitted or by cancelling the blocking command (S150).

While the present invention has been described with reference to preferred embodiments of the present invention, it is to be appreciated that various changes and modifications can be made by those skilled in the art without departing from the spirit and scope of the present invention as defined by the appended claims.

What is claimed is:

1. An intrusion protection system (IPS) switch system, comprising:
    a switching processor for switching inserted packets comprising at least one of packets whose destination port is an internal port and packets whose destination port is an external port to output the switched packets to a destination port, mirroring the packets whose destination port is the internal port to transmit the mirrored packets to a packet storing processor, and transmitting the packets whose destination port is the external port to an IPS processor;
    the packet storing processor for storing packets registered as suspicious internet protocol (IP) in the packets mirrored in the switching processor and other packets separately, the packet storing processor comprising a non-transitory computer-readable medium; and
    the IPS processor for blocking a packet whose maleficence has been confirmed by performing security inspection based on a protocol and pattern with respect to the packets stored in the packet storing processor and providing a blocking control policy to the output port based on the internet protocol (IP) and media access control (MAC) to the switching processor to block an internal terminal determined to be maleficent, wherein at least one of the switching processor, the packet storing processor, and the IPS processor is a hardware processor.

2. The IPS switch system of claim 1, wherein the packet storing processor selects and stores a storage space for the packets transmitted from the switching processor; and
    the packet storing processor comprise:
        a suspicious IP database for storing IP registered as the suspicious IP;
        a suspicious packet reservoir for storing packets having the same IP as the IP registered as the suspicious IP in the suspicious IP database; and
        an analysis packet reservoir for storing packets other than the packets having the same IP as the IP registered as the suspicious IP,
        wherein the packet storing processor stores the packets having the same IP as the IP registered as the suspicious IP in the suspicious packet reservoir and other packets in the analysis packet reservoir.

3. The IPS switch system of claim 2, wherein the analysis packet reservoir comprises:
    a first analysis packet reservoir for storing the packets other than the packets having the same IP as the IP registered as the suspicious IP; and
    a second analysis packet reservoir for storing the packets to be analyzed for maleficence inspection.

4. The IPS switch system of claim 3, wherein the second analysis packet reservoir is initiated when the maleficence inspection, at the IPS processor, of the packet stored in the second analysis packet reservoir is complete, and switches the second analysis packet reservoir and the first analysis packet reservoir, and the first analysis packet reservoir has a ring buffer structure.

5. The IPS switch system of claim 1, wherein the switching processor to mirror only the packets whose destination port is the internal port, the switching processor to forward inserted packets destined to the external port to the IPS processor without mirroring.

6. The IPS switch system of claim 1, wherein the switching processor to receive both the packets whose destination port is the internal connection port and the packets whose destination port is the external connection port.

7. The IPS switch system of claim 1, wherein the packet storing processor stores the packets having the suspicious IP in a different location than packets not having the suspicious IP.

8. A method for processing an intrusion protection system (IPS) switch system comprising a switching processor, a packet storing processor, and a IPS processor, the method comprising:
    (A) determining whether a destination port of a packet is an internal port or an external port when the packet is inserted into the switching processor;
    (B) by the switching processor, outputting the inserted packet to the internal port when the destination port is the internal port, and mirroring the output packet and transmitting the output packet to the packet storing processor;
    (C) by the IPS processor, performing internal threat detection and blocking when the packet transmitted to the packet storing processor matches internet protocol (IP) registered as suspicious IP; and
    (D) by the IPS processor, performing maleficence inspection by sample internal threat detection when the packet transmitted to the packet storing processor does not match the suspicious IP.

9. The method of claim 8, further comprising:
    (E) by the switching processor, transmitting to the IPS processor when the destination port is the external port as a result of the determination in the step (A);
    (F) by the IPS processor, performing external threat detection and blocking; and
    (G) by the IPS processor, transmitting a packet not maleficent to the external port.

10. The method of claim 8, further comprising:
    (H) by the packet storing processor, storing packets having the same internet protocol (IP) as the IP registered as the suspicious IP in a suspicious packet reservoir; and
    (I) by the packet storing processor, storing packets other than the packets having the suspicious IP in an analysis packet reservoir.

11. The method of claim 10, wherein the step (I) comprises:
    (i) storing the packets other than the packets having the suspicious IP after a record point location in a first analysis packet reservoir;
    (ii) by the packet storing processor, initializing a second analysis packet reservoir when changing a record location; and
    (iii) by the packet storing processor, switching the storage location from the second analysis packet reservoir to the first analysis packet reservoir.

* * * * *